United States Patent
Cernasov (10) Patent No.: US 7,307,779 B1
(45) Date of Patent: Dec. 11, 2007

(54) TRANSMISSIVE E-PAPER DISPLAY

(75) Inventor: Andrei Cernasov, Ringwood, NJ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/533,985

(22) Filed: Sep. 21, 2006

(51) Int. Cl.
*G02B 26/00* (2006.01)
*G09G 3/34* (2006.01)
*G03G 13/00* (2006.01)

(52) U.S. Cl. .................. 359/296; 345/107; 430/31; 430/32

(58) Field of Classification Search ............ 359/245, 359/253–254, 265, 290–291, 296; 349/33; 345/10; 430/31, 32
See application file for complete search history.

(56) References Cited

U.S. PATENT DOCUMENTS

| | | |
|---|---|---|
| 5,293,528 A | 3/1994 | DiSanto et al. |
| 5,745,094 A | 4/1998 | Gordon, II et al. |
| 5,872,552 A | 2/1999 | Gordon, II et al. |
| 5,961,804 A | 10/1999 | Jacobson et al. |
| 6,144,361 A | 11/2000 | Gordon, II et al. |
| 6,172,798 B1 | 1/2001 | Albert et al. |
| 6,271,823 B1 | 8/2001 | Gordon, II et al. |
| 6,337,761 B1 | 1/2002 | Rogers et al. |
| 6,525,865 B2 | 2/2003 | Katase |
| 6,525,866 B1 | 2/2003 | Lin et al. |
| 6,529,313 B1 | 3/2003 | Lin et al. |
| 6,535,326 B2 | 3/2003 | Uno |
| 6,574,034 B1 | 6/2003 | Lin et al. |
| 6,636,341 B2 | 10/2003 | Kanbe |
| 6,639,580 B1 | 10/2003 | Kishi et al. |
| 6,650,462 B2 | 11/2003 | Katase |
| 6,650,463 B2 | 11/2003 | Obikawa et al. |
| 6,677,926 B2 | 1/2004 | Biegelsen |
| 6,680,726 B2 | 1/2004 | Gordon, II et al. |
| 6,693,621 B1 | 2/2004 | Hayakawa et al. |
| 6,710,540 B1 | 3/2004 | Albert et al. |
| 6,727,873 B2 | 4/2004 | Gordon, II et al. |
| 6,727,882 B1 | 4/2004 | Large et al. |
| 6,727,883 B2 | 4/2004 | Uno et al. |
| 6,738,039 B2 | 5/2004 | Goden |
| 6,741,385 B2 | 5/2004 | Ikeda et al. |
| 6,750,844 B2 | 6/2004 | Nakanishi |
| 6,751,007 B2 | 6/2004 | Liang et al. |
| 6,751,008 B2 | 6/2004 | Liang et al. |
| 6,762,744 B2 | 7/2004 | Katase |
| 6,781,745 B2 | 8/2004 | Chung et al. |
| 6,788,449 B2 | 9/2004 | Liang et al. |
| 6,795,229 B2 | 9/2004 | Liang et al. |
| 6,806,995 B2 | 10/2004 | Chung et al. |
| 6,816,146 B2 | 11/2004 | Harada et al. |
| 6,822,783 B2 | 11/2004 | Matsuda et al. |
| 6,829,078 B2 | 12/2004 | Liang et al. |
| 6,831,770 B2 | 12/2004 | Liang et al. |

(Continued)

*Primary Examiner*—Scott J. Sugarman
*Assistant Examiner*—DaWayne A Pinkney
(74) *Attorney, Agent, or Firm*—Ingrassia Fisher & Lorenz (57) ABSTRACT

In accordance with the invention, there are systems for electronic paper, apparatus for electrophoretic display, and methods of making an electrophoretic display. The system for electronic paper can comprise a light transmissive electret substrate comprising a gradient of charges and a plurality of capsules disposed in the light transmissive electret substrate, wherein each of the plurality of capsules can comprise a plurality of charged pigments with a polarity opposite to that of the charges in the light transmissive electret substrate.

22 Claims, 5 Drawing Sheets

U.S. PATENT DOCUMENTS

| | | |
|---|---|---|
| 6,833,943 B2 | 12/2004 | Liang et al. |
| 6,844,958 B2 * | 1/2005 | Kawai ........................ 359/296 |
| 6,850,355 B2 | 2/2005 | Liang et al. |
| 6,850,357 B2 | 2/2005 | Kaneko et al. |
| 6,859,302 B2 | 2/2005 | Liang et al. |
| 6,862,129 B2 | 3/2005 | Matsuda et al. |
| 6,865,012 B2 | 3/2005 | Liang et al. |
| 6,867,898 B2 | 3/2005 | Liang et al. |
| 6,873,451 B2 | 3/2005 | Ukigaya |
| 6,885,495 B2 | 4/2005 | Liang et al. |
| 6,897,996 B2 | 5/2005 | Ikeda et al. |
| 6,900,924 B2 | 5/2005 | Goden |
| 6,906,851 B2 | 6/2005 | Yuasa |
| 6,909,532 B2 | 6/2005 | Chung et al. |
| 6,922,275 B2 | 7/2005 | Ikeda |
| 2001/0055000 A1 * | 12/2001 | Kanae et al. ................ 345/107 |

* cited by examiner

OPAQUE  TRANSPARENT

FIG. 5A  FIG. 5B

FIG. 6

TRANSMISSIVE E-PAPER DISPLAY

FIELD OF THE INVENTION

The subject matter of this invention relates to display systems. More particularly, the subject matter of this invention relates to an apparatus and a system for transmissive electronic paper display.

BACKGROUND OF THE INVENTION

Electronic paper or e-paper displays address the need for inexpensive yet flexible devices for large area and disposable applications which are unsuitable for standard liquid crystal displays (LCD) and light emitting diode (LED) displays. Some of the applications such as posters and billboards require high levels of output which can only be accommodated by the use of an appropriate backlight. However, current e-paper designs are reflective and therefore are incompatible with the use of the backlights.

Accordingly, there is a need for e-paper which is transmissive. Moreover, there is also a need for a transmissive e-paper display that is able to display gray levels.

SUMMARY OF THE INVENTION

In accordance with the invention, there is a system for electronic paper. The system can include a light transmissive electret substrate including a gradient of charges and a plurality of capsules disposed in the light transmissive electret substrate, wherein each of the plurality of capsules includes a plurality of charged pigments with a polarity opposite to that of the charges in the light transmissive electret substrate.

According to another embodiment of the present teachings, there is an apparatus for an electrophoretic display. The apparatus can include a light transmissive electret substrate including a gradient of charges and a plurality of capsules disposed in the light transmissive electret substrate, wherein each of the plurality of capsules includes a plurality of charged pigments with a polarity opposite to that of the charges in the light transmissive electret substrate.

According to yet another embodiment of the present teachings, there is a method of making an electrophoretic display. The method can include providing a light transmissive electret substrate including a gradient of charges and providing a plurality of capsules disposed in the light transmissive electret substrate, wherein each of the plurality of capsules includes a plurality of charged pigments with a polarity opposite to that of the charges in the light transmissive electret substrate. The method can also include providing a plurality of first light transmissive electrode interfaced with a first side of the light transmissive electret substrate, wherein the first light transmissive electrodes are spatially separated from one another and providing a plurality of second light transmissive electrode interfaced with a second side of the light transmissive electret substrate, wherein the second light transmissive electrodes are spatially separated from one another. The method can further include providing a power supply to apply a voltage to at least one of each of the first and second light transmissive electrodes.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

As used herein, the terms "electronic paper" and "e-paper" are used interchangeably with the terms electrophoretic display, displacement particle display, particle display, flexible display, and disposable display.

Figure 1A:
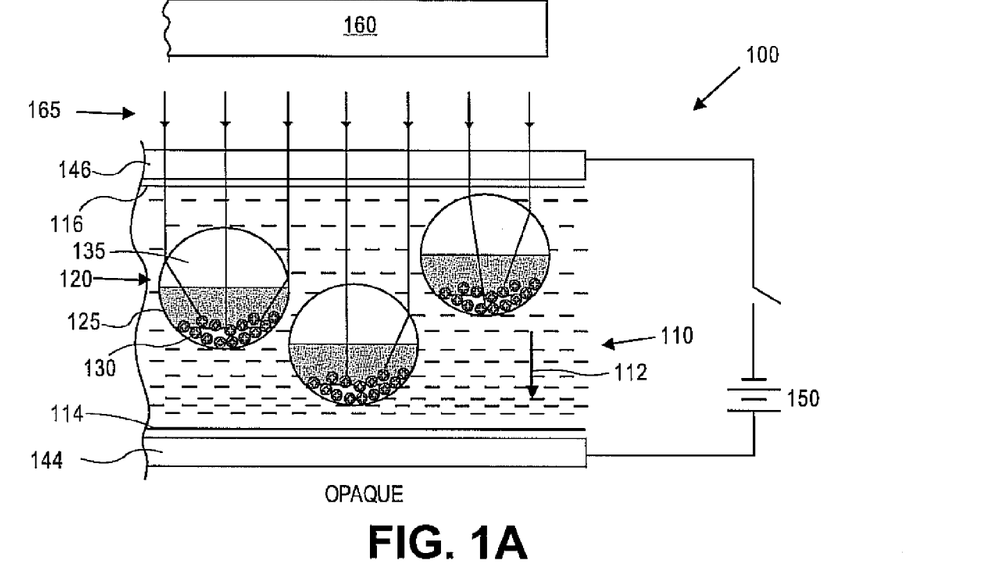
FIGS. 1A and 1B schematically illustrate a portion of a pixel of a collection of pixels of exemplary systems 100 and 100' for electronic paper.
Figure 1B:
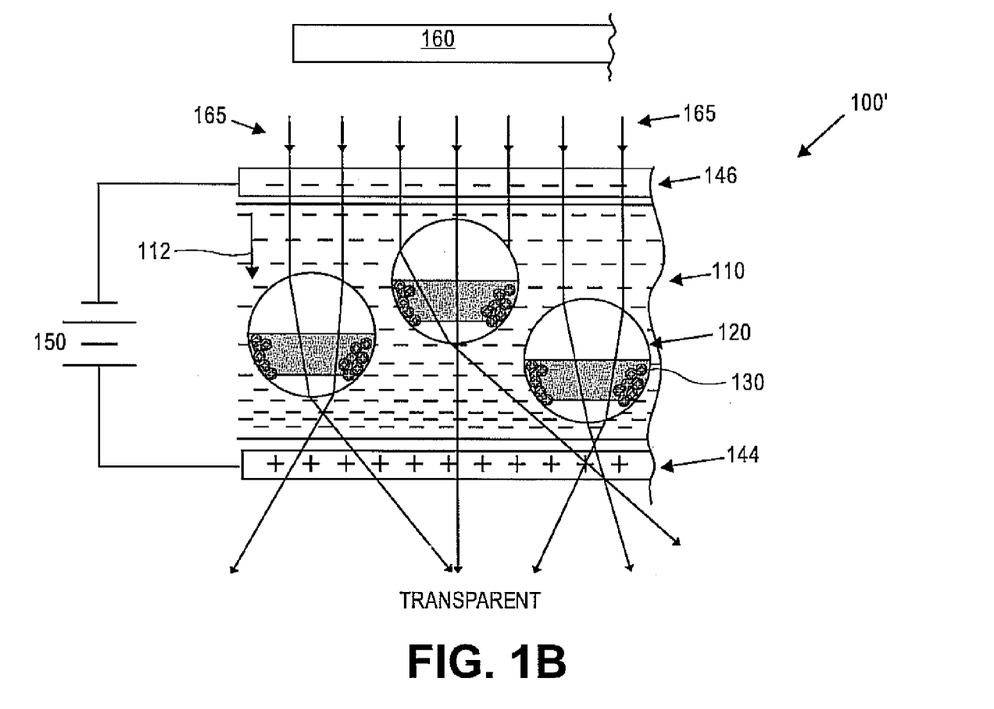
Figure 2:
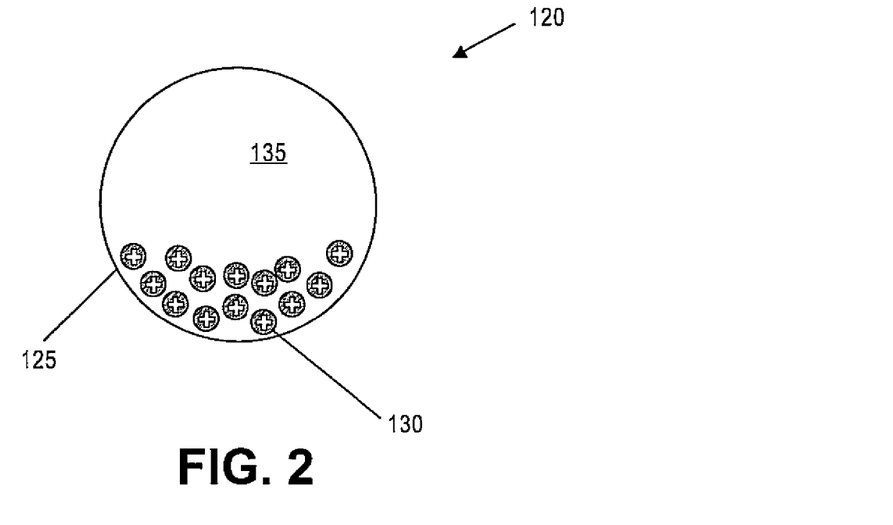
FIG. 2 illustrates an exemplary capsule with positively charged pigments.

A system for light transmissive electronic paper includes an array of pixels. The term "pixel" is used interchangeably herein with terms including cell and unit cell. FIGS. 1A and 1B schematically illustrate a portion of a pixel of a collection of pixels of exemplary systems 100 and 100' for electronic paper. The exemplary systems 100 and 100' for electronic paper can include a light transmissive electret substrate 110 with a gradient of charges 112 and a plurality of capsules 120 disposed in the light transmissive electret substrate 110. In some embodiments, each of the plurality of capsules 120 can include a plurality of charged pigments 130, with a polarity of the charged pigments 130 opposite to that of the charges in the light transmissive electret substrate 110. FIG. 2 shows an exemplary capsule 120 disposed with positively charged pigments 130. The exemplary capsule 120 can also include a light transmissive fluid 135, and a housing 125 configured to house the plurality of charged pigments 130 and the light transmissive fluid 135. According to various embodiments, each of the plurality of capsules 120 can have a refractive index (n1) different from the refractive index (n2) of the light transmissive electret substrate 110. The exemplary systems 100 and 100' for electronic paper as shown in FIGS. 1A and 1B can also include a plurality of first light transmissive electrodes 144 interfaced with a first side 114 of the light transmissive electret substrate 110, wherein the first light transmissive electrodes 144 are spatially separated from one another and a plurality of second light transmissive electrodes 146 interfaced with a second side 116 of the light transmissive electret substrate 110, wherein the second light transmissive electrodes 146 are spatially separated from one another. The exemplary systems 100 and 100' can further include a power supply 15.0 that can provide an external electric field across at least one of each of the first and second light transmissive electrodes 144 and 146, wherein in response to the external electric field, the plurality of charged pigments 130 move in the direction of the light transmissive electrode having a polarity that is opposite to that of the charged pigments 130, thereby rendering the system of electronic paper transparent as shown in FIG. 1B. The exemplary systems 100 and 100' can also include a backlight 160 that can produce the light beam 165 incident on the light transmissive electret substrate 110.

FIG. 1A depicts the exemplary system 100 in the absence of an external electric field across at least one of each of the first and the second light transmissive electrodes 144 and 146. As shown in FIG. 1A, in the absence of the external electric field, the plurality of charged pigments 130 move forward within the capsule 120 in response to the electric field due to the gradient of charges 112 in the light transmissive electret substrate 110, thereby blocking the light beam 165 from the backlight 160 and rendering the system of electronic paper opaque.

FIG. 1B depicts the exemplary system 100, in response to an external electric field across at least one of each of the first and second light transmissive electrodes 144 and 146. When a voltage is applied to at least one of each of the first and second light transmissive electrodes 144 and 146, the first light transmissive electrode 144 can develop a positive charge and the second light transmissive electrode 146 can develop a negative charge. As depicted in FIG. 1B, in response to the external electric field, the plurality of charged pigments 130 move in the direction of the second light transmissive electrode 146 having a negative polarity that is opposite to that of the charged pigments 130, thereby rendering the display transparent by moving out of the path of the light beam 165 from the backlight 160. The movement of the plurality of the charged pigments 130 can be in proportion to the applied voltage, thereby a field dependent transparency can be created and also a gray scale level can be achieved.

Figure 3A:
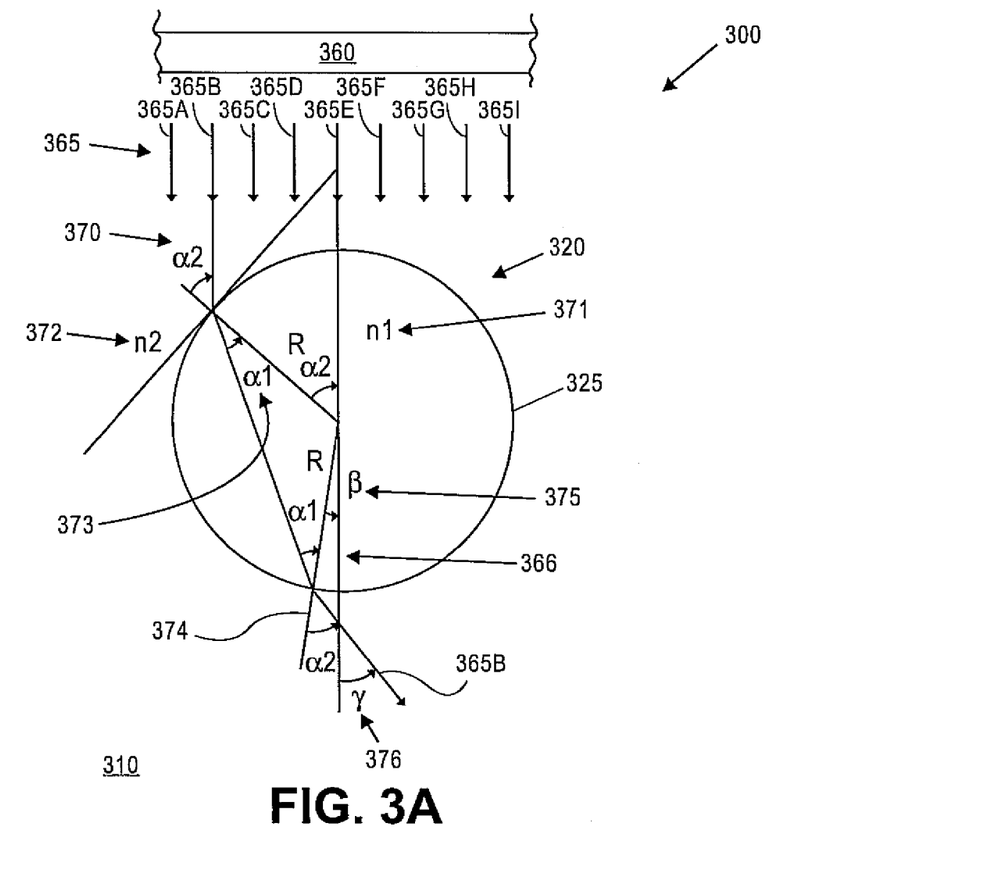
FIGS. 3A and 3B schematically illustrate an exemplary optics of an exemplary spherical housing of a capsule used by the electrophoretic electronic paper to hold the charged pigments.
Figure 3B:
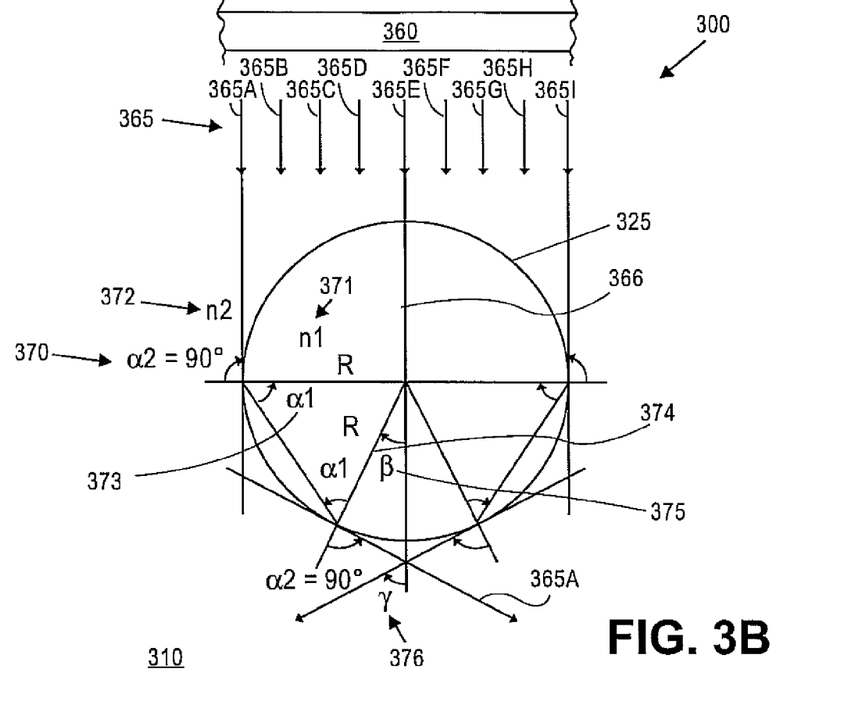

Referring back to FIGS. 1A and 1B, when the light beam 165 from the backlight 160 is incident on the plurality of capsules 120 disposed in the light transmissive electret substrate 110, the light beam undergo refraction and reflection at the interface of the capsule 120 and the light transmissive electret substrate 110 due to the difference in the refractive indices. Further, the housing 125 of the capsule 120 can act as optical lens. FIGS. 3A and 3B illustrate exemplary optics 300 of an exemplary spherical housing 325 of a capsule 320 used by the electrophoretic electronic paper displays to hold the charged pigments 130. The exemplary optics 300 can include a spherical housing 325 disposed in a light transmissive electret substrate 310 and a backlight 360. The backlight 360 can produce a light beam 365 incident on the spherical housing 325. The inside of the spherical housing 325 can have a first refractive index 371 (n1) and the light transmissive electret substrate 310 surrounding the spherical housing 325 through which the light beam 365 travels before being incident on the spherical housing 325, can have a second refractive index 372 (n2). The light beam 365 can include a plurality of light rays such as 365A-365I as depicted in FIGS. 3A and 3B. FIGS. 3A and 3B illustrate that the light rays 365A-365I can be incident on the spherical housing 325 at a variety of incident angles 370 ($\alpha 2$) dictated by the shape of the surface of the spherical housing 325. For the purpose of illustration, consider the light ray 365B. In FIG. 3A, the light ray 365B is incident on the housing 325 at an incident angle 370 ($\alpha 2$). The light ray 365B undergoes refraction at the interface of the light transmissive electret substrate 310 and the spherical housing 325. The refracted light ray 365B travels through the inside of the spherical housing 325 at a refracted angle 373 ($\alpha 1$) determined by Snell's law. The refracted light ray 365B inside the spherical housing 325 is refracted again at the interface of the spherical housing 365 and the light transmissive electret substrate 310 and emerges out of the spherical housing 325 into the light transmissive electret substrate 310 at an exit angle ($\alpha 2$) same as the incident angle 370 ($\alpha 2$) with respect to the local normal axis.

One difference between FIG. 3A and FIG. 3B is the angle of incidence 370 ($\alpha 2$) of the light ray. In FIG. 3B, the light ray 365A is incident on the spherical housing 325 at an incident angle 370 ($\alpha 2$) of about 90°, the maximum incident angle ($\alpha 2_{max}$). At the maximum incident angle ($\alpha 2_{max}$) of 90°, the light ray 365A is tangent to the spherical housing 325. The light ray 365A undergoes refraction at the interface of the light transmissive electret substrate 310 and the spherical housing 325. The refracted light ray 365A travels through the inside of the spherical housing 325 at a refracted angle 373 ($\alpha 1$) determined by Snell's law. The refracted light ray 365A inside the spherical housing 325 is refracted again at the interface of the spherical housing 365 and the light transmissive electret substrate 310 and emerges out of the spherical housing 325 into the light transmissive electret substrate 310 at an exit angle of about 90° ($\alpha 2$) same as the incident angle 370 ($\alpha 2$) with respect to the local normal axis.

In FIGS. 3A and 3B, the angle between the exit normal axis 374 and the direction 366 of the light beam 365 is defined as $\beta$ 375. The maximum $\beta$ value ($\beta_{max}$) describes the internal exit cone that all parallel light rays 365A-365I entering the spherical housing 325 must leave through. The external exit cone pattern is described by $\gamma$ 376, which is an angle between the refracted light beam 365 exiting out of the spherical housing 325 and the direction 366 of the light beam 365. $\beta$ and $\gamma$ can be calculated from the incident angle $\alpha 2$ and the refracted angle $\alpha 1$:

$$\beta = 2\alpha 1 - \alpha 2 \qquad (1)$$

$$\gamma = 2\alpha 2 - 2\alpha 1 \qquad (2)$$

From Snell's law: $n1 \sin(\alpha 1) = n2 \sin(\alpha 2)$, therefore $\beta_{max}$ the maximum angle between the exit normal axis 374 and the direction 366 of the light beam 365 and $\alpha 2_{max}$, which is the incident angle at which β has the maximum value $\beta_{max}$ can be calculated as follows:

$$\cos(\alpha 2_{max}) = \sqrt{\frac{n1^2 - n2^2}{3n2^2}} \quad (3)$$

$$\beta_{max} = 2\arcsin\left(\frac{n2}{n1}\sin(\alpha 2)\right) - \alpha 2_{min} \quad (4)$$

where n1 is the refractive index of the inside of the spherical housing 325 and n2 is the refractive index of the light transmissive electret substrate 310 surrounding the spherical housing 325. For a non limiting example, n1=1.5 and n2=1.3, the output angles α1, β and γ can be calculated from the incident angle α2 and the results are summarized in Table 1.

TABLE 1

| α2 | α1 | β = 2α1 − α2 | γ = 2(α2 − α1) |
|----|----|--------------|----------------|
| 30 | 26 | 22 | 8 |
| 45 | 38 | 31 | 14 |
| 60 | 49 | 38 | 22 |
| 90 | 60 | 30 | 60 |

Figure 4:
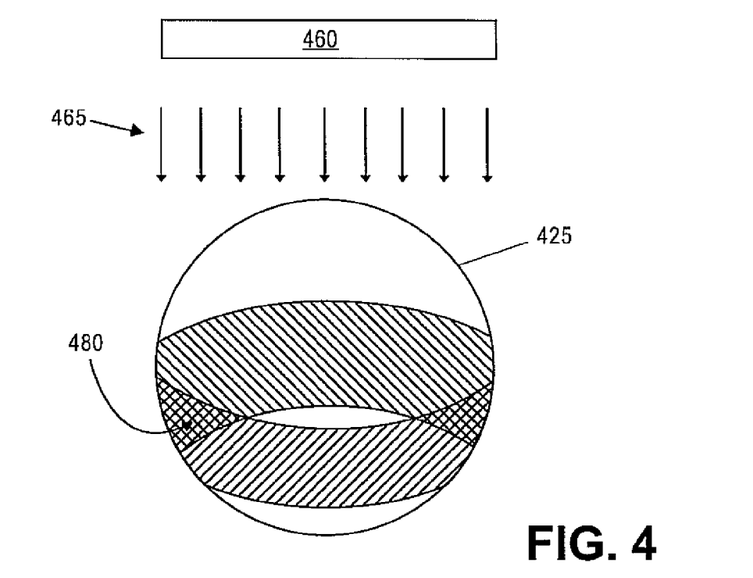
FIG. 4 schematically illustrates an exemplary blind band in the spherical housing of a capsule.

$\beta_{max}$ can be calculated using equations 3 and 4. At an incident angle of about 64°, the angle β reaches a maximum value of about 38°. Since the internal exit cone is defined by $\beta_{max}$, this implies that the region between the β of about 38° and 90° is blind, i.e. no incident light rays 365A-365I can leave the spherical housing 325 through that band. Hence, the region between the β of about $\beta_{max}$ and 90° is referred to as blind band. FIG. 4 schematically illustrates the blind band 480 in the spherical housing 425.

Figure 5A:
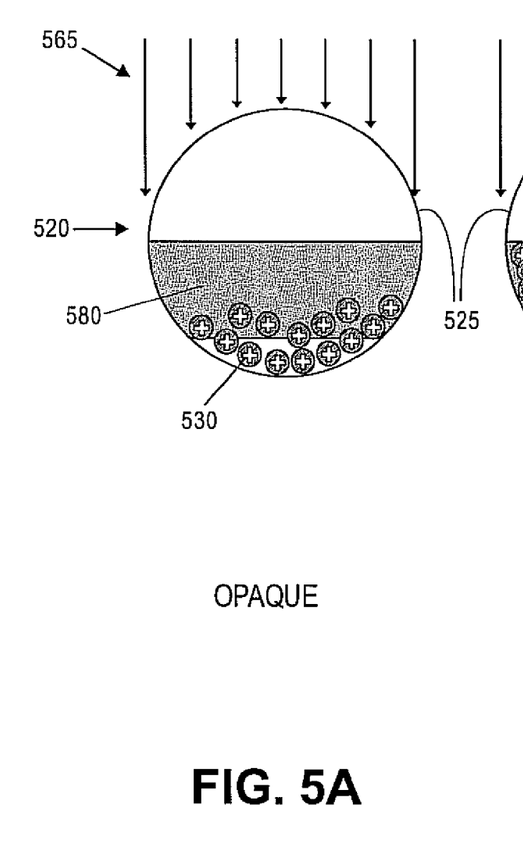
FIGS. 5A and 5B schematically illustrate the effect of the position of the pigments inside the spherical housing of a capsule on the transmissive property of the capsule in accordance with various embodiments of the present teachings.
Figure 5B:
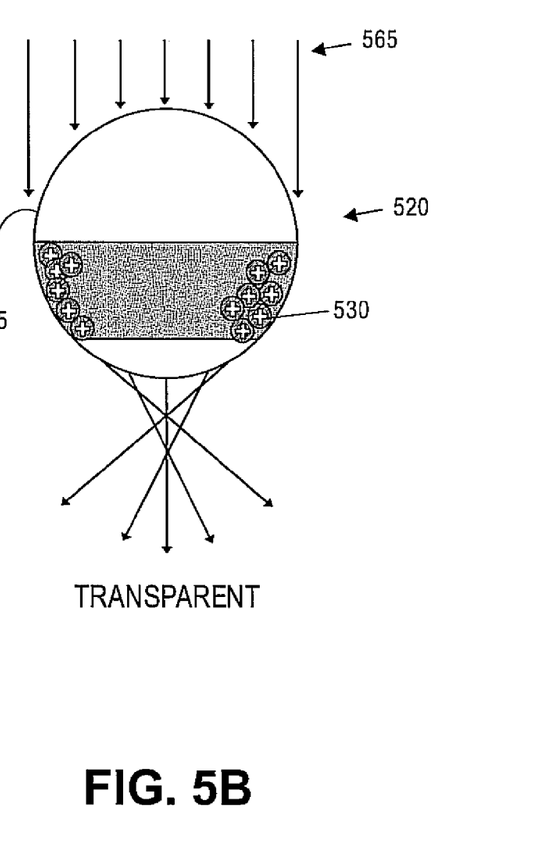

FIGS. 5A and 5B schematically illustrate the effect of the position of the pigments 530 inside the spherical housing 525 of a capsule 520 on the transmissive property of the capsule 520. When the pigments 530 can be placed against the spherical housing 525 within the blind band 580, i.e. the region between $\beta_{max}$ and 90°, the pigments 530 will not be in the path of the light beam 565 from the back light 560 as shown in FIG. 5B and thereby making the capsule 520 transparent. However, when the pigments 530 can be placed against the spherical housing 525, but within the internal exit cone defined by $\beta_{max}$ cone, the pigments 530 will be in the path of the light beam 565 from the back light 560 as shown in FIG. 5A and thereby making the capsule 520 opaque.

Referring back to FIG. 1A, the schematic illustration of the exemplary system 100 for light transmissive electronic paper is shown without an applied voltage to the first and second transmissive electrodes 144 and 146. In the absence of the applied voltage, the plurality of charged pigments 130 move within the internal exit cone defined by $\beta_{max}$ within the capsule 120 in response to the electric field due to the gradient of charges 112 in the light transmissive electret substrate 110, thereby blocking the light from the backlight 160 and rendering the display opaque. FIG. 1B depicts the schematic illustration of the exemplary system 100' for light transmissive electronic paper with an applied voltage to the first and second transmissive electrodes 144 and 146. In response to the applied voltage, the charged pigments 130 move in the direction of the second light transmissive electrode 146 having a negative polarity that is opposite to that of the positively charged pigments 130. The displacement of the charged pigments 130 is proportional to the applied voltage. If the voltage applied is strong enough to move the charged pigments 130 to the blind band, i.e. the region between $\beta_{max}$ and 90°, the display can be rendered transparent. By adjusting the voltage applied to the first and second transmissive electrodes 144 and 146, the pigments 130 can be either partially or completely moved into the blind band, i.e. the region between $\beta_{max}$ and 90°, thereby creating a field dependent transparency, and hence capability to achieve gray scale.

The light transmissive electret substrate 110 can include at least one highly insulating clear polymer such as fluoropolymers, polypropylene, polyethyleneterephthalate, etc., with a gradient of charges. According to various embodiments, the gradient of charges 112 in a light transmissive electret substrate 110 can be formed by exposing one side of the light transmissive electret substrate 110 to an intense source of electrons. The electrons from the intense source can penetrate the light transmissive electret substrate 100 exponentially thereby giving a gradient of charges 112 to the light transmissive electret substrate 100. In other embodiments, gradient of changes 112 in a light transmissive electret substrate 110 can be formed by stacking multiple layers of light transmissive electret substrate, with each layer having a charge greater than that of the layer underneath. The housing 125 of the capsule 120 can be implemented with a low permittivity dielectric material such as Teflon®, polyethylene, or other similar materials. In some embodiments, the housing 125 can be implemented as part of the light transmissive electret substrate 110 that is not charged. More particularly, the capsule 120 can be embedded in the charged light transmissive electret substrate 110. In FIGS. 1A and 1B, the light transmissive electret substrate 110 is shown to include a gradient 112 of negative charges and the plurality of charged pigments 130 are shown to have positive charges. However, one of the requirements for transmissive e-paper displays is that the light transmissive electret substrate 110 and the plurality of charged pigments 130 are oppositely charged and hence they can have either a positive or a negative charge.

In certain embodiments, the capsules 120 can have a size with diameter ranging from about 20 μm to about 200 μm, and in some cases from about 50 μm to about 100 μm. The plurality of capsules 120 disposed in the light transmissive electret substrate 110 can either have same or different sizes. In other embodiments the capsule 120 can be ellipsoidal in shape. In general, a differential in the refractive indices of the capsule 120 and the light transmissive electret substrate 110 can be present for a transmissive e-paper display. In some embodiments, the refractive index of the capsule 120 can be greater than that of the light transmissive electret substrate 110.

In various embodiments, the first and second light transmissive electrodes 144 and 146 can include a standard X-Y Indium Tin Oxide ("ITO") array. The ITO array 144 and 146 can be configured to provide control of the capsules 120 on a pixel basis. In some embodiments, a thin layer of aluminum or gold can be used as the first and second light transmissive electrodes 144 and 146. In various embodiments, an electric field of up to 1 million Volt/meter can be applied to the first and second light transmissive electrodes 144 and 146. In certain embodiments, an exemplary voltage in the range of about 0.5 V to about 50 V can be applied to the first and second light transmissive electrodes 144 and 146.

Figure 6:
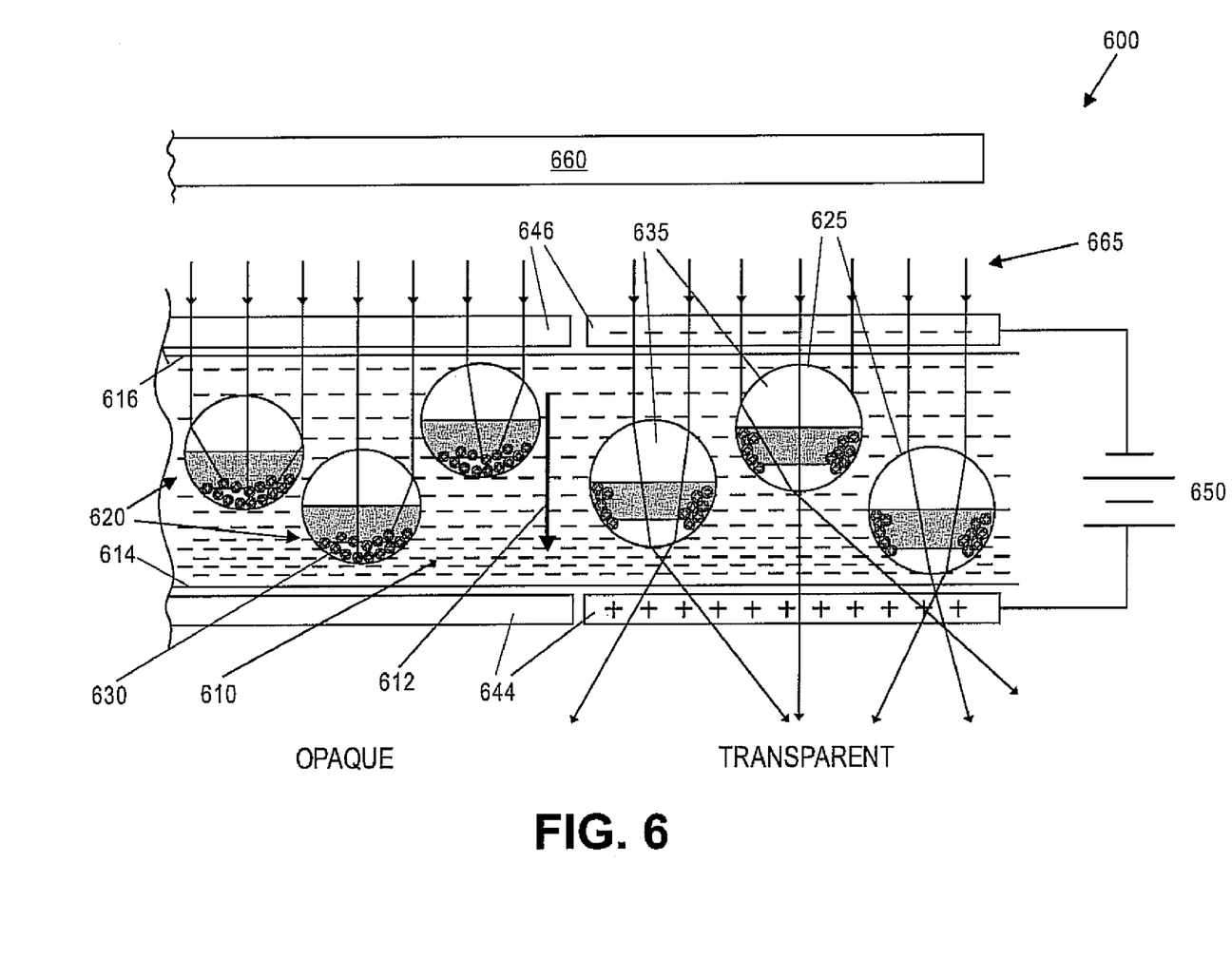
FIG. 6 is a schematic illustration of an exemplary apparatus for an electrophoretic display according to the present teachings.

According to various embodiments, an apparatus for an electrophoretic display 600 is illustrated in FIG. 6. The apparatus for an electrophoretic display 600 can include a light transmissive electret substrate 610 including a gradient of charges 612 as shown in FIG. 6. The light transmissive electret substrate 610 can include a plurality of capsules 620, wherein each of the plurality of the capsules 620 can include a plurality of charged pigments 630. The apparatus for an electrophoretic display 600 can also include a plurality of first light transmissive electrode 644 interfaced with a first side 614 of the light transmissive electret substrate 610, wherein the first light transmissive electrodes 644 are spatially separated from one another and a plurality of second light transmissive electrode 646 interfaced with a second side 616 of the light transmissive electret substrate 610, wherein the second light transmissive electrodes 644 are spatially separated from one another. The apparatus for an electrophoretic display 600 can further include a power supply 650 that provides a voltage to at least one of each of the first and second light transmissive electrodes 644 and 646. The apparatus for an electrophoretic display 600 can also include a backlight 660 to provide a light beam 665 incident on the light transmissive substrate 610. In the absence of an applied voltage to at least one of the first and the second light transmissive electrodes 644 and 646, the plurality of charged pigments 630 move forward in response to the electric field within the capsule 620 due to the gradient of charges 612 in the light transmissive electret substrate 610. If the charged pigments 630 move to an area within the internal exit cone defined by $\beta_{max}$, the incident light beam 665 can be blocked thereby rendering the electrophoretic display 600 opaque. When a voltage is applied to the first and the second light transmissive electrodes 644 and 646, the plurality of charged pigments 630 move in response to an electric field created by the voltage in the direction of the light transmissive electrode having a polarity that is opposite to that of the charged pigments 630. If the charged pigments 630 move to the blind band 480, i.e. the region between $\beta_{max}$ and 90°, the electrophoretic display 600 can be rendered transparent. Further, the movement of the plurality of the charged pigments 630 is proportional to the applied voltage thereby a field dependent transparency and hence grayscale can be created.

According to yet another embodiment, there is a method of making an electrophoretic display 600. The method can include providing a light transmissive electret substrate 610 including a gradient of charges 612, and a plurality of capsules 620 disposed in the light transmissive electret substrate 610. Each of the plurality of the capsules 620 can include a plurality of charged pigments 630. The method can also include interfacing a plurality of first light transmissive electrodes 644 with a first side 614 of the light transmissive electret substrate 610, wherein the first light transmissive electrodes 644 are spatially separated from one another and interfacing a plurality of second light transmissive electrodes 646 with a second side 616 of the light transmissive electret substrate 610, wherein the second light transmissive electrodes 646 are spatially separated from one another. The method can further include providing a power supply 650 to supply voltage to at least one of each of the first and second transmissive electrodes 644 and 646 and a backlight 660 to provide a light beam 665 incident on the light transmissive substrate 610. In the absence of the applied voltage to at least one of each of the first and the second light transmissive electrodes 644 and 646, the plurality of charged pigments 630 move in response to the electric field within the capsule 620 due to the gradient of charges 612 in the light transmissive electret substrate 610, thereby rendering the electrophoretic display 600 opaque. The method can further include applying the voltage to at least one of each of the first and second transmissive electrodes 644 and 646, thereby resulting in the movement of the plurality of charged pigments 630 towards the light transmissive electrode having a polarity that is opposite to that of the charged pigments 630 and thereby rendering the electrophoretic display transparent. Hence, the movement of the plurality of the charged pigments 630 in proportion to the applied field can create a field dependent transparency and hence grayscale. The method can also include illuminating the light transmissive electret substrate 610 with a backlight 660.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for electronic paper, the system comprising:
  a light transmissive electret substrate comprising a gradient of charges; and
  a plurality of capsules disposed in the light transmissive electret substrate, wherein each of the plurality of capsules comprises a plurality of charged pigments with a polarity opposite to that of the charges in the light transmissive electret substrate.

2. The system of claim 1, further comprising a plurality of first light transmissive electrodes interfaced with a first side of the light transmissive electret substrate, wherein the first light transmissive electrodes are spatially separated from one another and a plurality of second light transmissive electrodes interfaced with a second side of the light transmissive electret substrate wherein the second light transmissive electrodes are spatially separated from one another.

3. The system of claim 2, further comprising a power supply that provides an external electric field across at least one of each of the first and second light transmissive electrodes.

4. The system of claim 1, further comprising a backlight for passing light through the light transmissive electret substrate.

5. The system of claim 1, wherein each of the plurality of capsules has a refractive index different from a refractive index of the light transmissive electret substrate.

6. The system of claim 1, wherein the capsule comprises:
  a light transmissive fluid; and
  a housing configured to house the plurality of charged pigments and fluid.

7. The system of claim 1, wherein the capsules have a size with diameter ranging from about 20 μm to about 200 μm.

8. The system of claim 2, wherein each of the first and second light transmissive electrodes comprises a multiplexing ITO array.

9. The system of claim 1, wherein the light transmissive electret substrate comprises at least one of clear fluoropolymer, polypropylene, and polyethyleneterephthalate.

10. An apparatus for an electrophoretic display, the apparatus comprising:
   a light transmissive electret substrate comprising a gradient of charges; and
   a plurality of capsules disposed in the light transmissive electret substrate, wherein each of the plurality of capsules comprises a plurality of charged pigments with a polarity opposite to that of the charges in the light transmissive electret substrate.

11. The apparatus of claim 10 further comprising a plurality of first light transmissive electrodes interfaced with a first side of the light transmissive electret substrate, wherein the first light transmissive electrodes are spatially separated from one another and a plurality of second light transmissive electrodes interfaced with a second side of the light transmissive electret substrate wherein the second light transmissive electrodes are spatially separated from one another.

12. The apparatus of claim 10 further comprising a power supply that provides a voltage to at least one of each of the first and second light transmissive electrodes.

13. The apparatus of claim 10 further comprising a backlight for passing light through the light transmissive electret substrate.

14. The apparatus of claim 10, wherein the capsules have a refractive index different from a refractive index of the light transmissive electret substrate.

15. The apparatus of claim 10, wherein the capsule comprises:
   a clear light transmissive fluid; and
   a housing configured to house the plurality of charged pigments and fluid.

16. The apparatus of claim 10, wherein the capsules have a size with diameter ranging from about 20 μm to about 200 μm.

17. The apparatus of claim 10, wherein each of the first and second light transmissive electrodes comprises a multiplexing ITO array.

18. The apparatus of claim 10, wherein the light transmissive electret substrate comprises at least one of a fluoropolymer, a polypropylene, and a polyethyleneterephthalate.

19. A method of making an electrophoretic display, the method comprising:
   providing a light transmissive electret substrate comprising a gradient of charges;
   providing a plurality of capsules disposed in the light transmissive electret substrate, wherein each of the plurality of capsules comprises a plurality of charged pigments with a polarity opposite to that of the charges in the light transmissive electret substrate;
   providing a plurality of first light transmissive electrodes interfaced with a first side of the light transmissive electret substrate, wherein the first light transmissive electrodes are spatially separated from one another;
   providing a plurality of second light transmissive electrodes interfaced with a second side of the light transmissive electret substrate, wherein the second light transmissive electrodes are spatially separated from one another; and
   providing a power supply to apply a voltage to at least one of each of the first and second light transmissive electrodes;
   wherein in the absence of the applied voltage to at least one of each of the first and the second light transmissive electrodes, the plurality of charged pigments move in response to the electric field within the capsule due to the gradient of charges in the light transmissive electret substrate, thereby rendering the electrophoretic display opaque.

20. The method of claim 19, further comprising applying the voltage to at least one of each of the first and second light transmissive electrodes, thereby resulting in the movement of the plurality of charged pigments towards the light transmissive electrode having a polarity that is opposite to that of the charged pigments thereby rendering the electrophoretic display transparent.

21. The method of claim 19, wherein the movement of the plurality of the charged pigments is in proportion to the applied voltage to at least one of each of the first and the second light transmissive electrodes thereby creating a field dependent transparency.

22. The method of claim 19 further comprising illuminating the light transmissive electret substrate with a backlight.

* * * * *